United States Patent [19]

Kawano et al.

[11] Patent Number: 4,955,595
[45] Date of Patent: Sep. 11, 1990

[54] DOCUMENT FEEDING APPARATUS

[75] Inventors: Minoru Kawano; Kazunobu Miura; Kazushige Murata; Mitsuru Nagoshi, all of Tokyo, Japan

[73] Assignee: Konica Corporation, Tokyo, Japan

[21] Appl. No.: 401,788

[22] Filed: Sep. 1, 1989

[30] Foreign Application Priority Data

Sep. 7, 1988 [JP] Japan .................. 63-224009
Sep. 7, 1988 [JP] Japan .................. 63-117769

[51] Int. Cl.⁵ ............................................. B65H 3/44
[52] U.S. Cl. .......................................... 271/9; 271/162
[58] Field of Search ............................ 271/9, 171, 162

[56] References Cited

U.S. PATENT DOCUMENTS 4,429,863  2/1984  Itoh .......................................... 271/9

FOREIGN PATENT DOCUMENTS 74838  4/1988  Japan ........................................ 271/9

Primary Examiner—Richard A. Schacher
Attorney, Agent, or Firm—Finnegan, Henderson, Farabow, Garrett, and Dunner

[57] ABSTRACT

A document feeding apparatus having a document feed unit adapted to feed documents, which are placed on a stacked document feed tray, sheet by sheet toward a document glass plate in an exposure unit. An auxiliary document feed tray is turnably housed in the document feed tray. The auxiliary document feed tray is turned so as to project over the stacked document feed tray when the documents are fed sheet by sheet by hand so that the front end portion of the auxiliary document feed tray narrows a document feed port of the document feed unit to render the stacked documents difficult to be inserted thereinto.

2 Claims, 7 Drawing Sheets

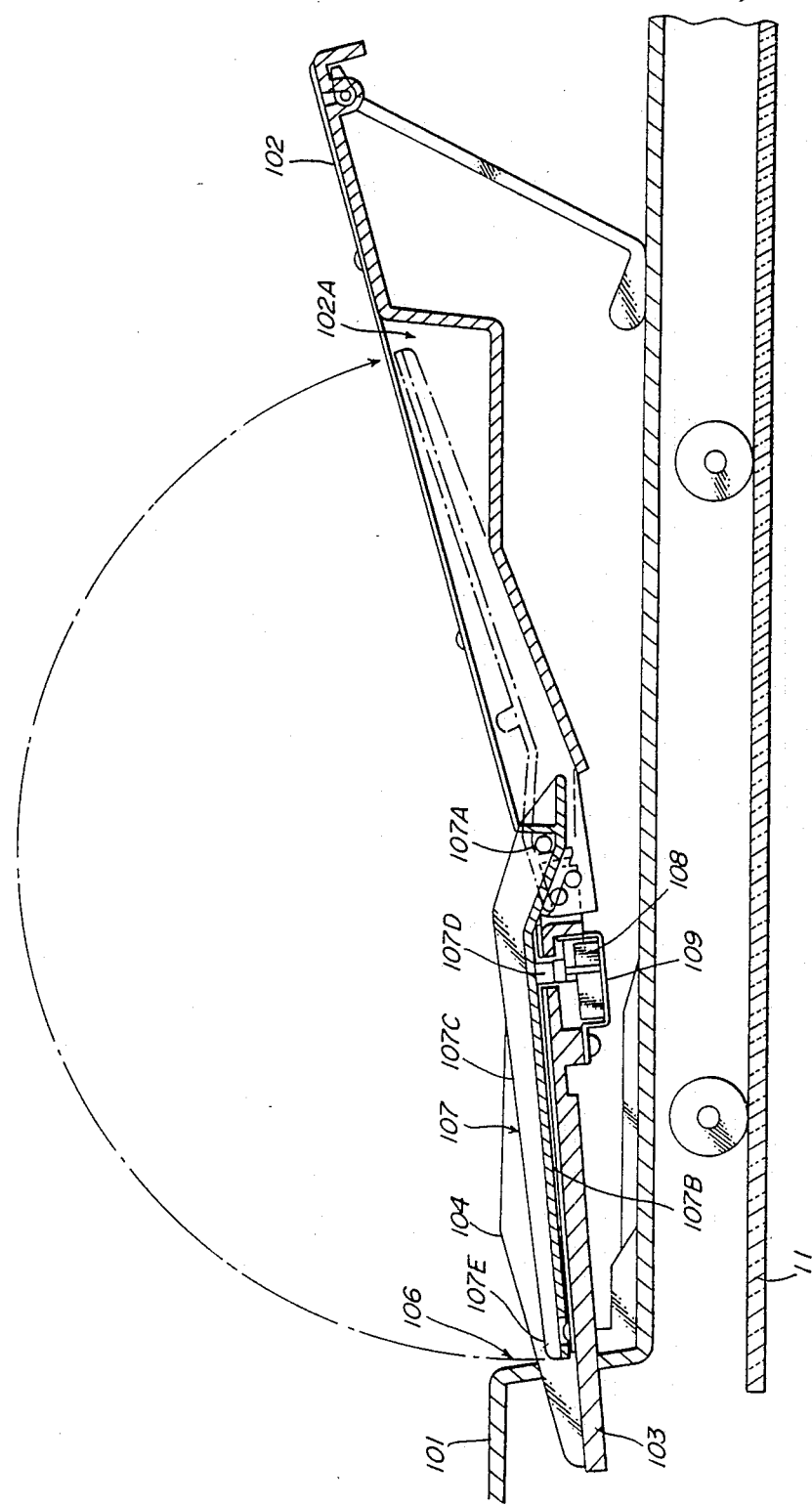

DOCUMENT FEEDING APPARATUS

BACKGROUND OF THE INVENTION

1. Field of the Invention:

This invention relates to an improvement in a document feeding apparatus adapted to automatically feed a document from a document feed tray onto a document glass plate in a reproducing machine or an image reading device and discharge the document from the document glass plate after it has been processed, and more particularly to a document feeding apparatus having means for feeding documents sheet by sheet by hand.

2. Description of the Prior Art:

In an image recording apparatus, such as an electrophotographic reproducing machine or an image reading device, an automatic document feeding apparatus (which will hereinafter be referred to as ADF) is used so as to efficiently carry out a preprocessing for an image processing process (copying process). This ADF is adapted to go into an ADF mode when a plurality of sheet documents are set on the document feed tray. In accordance with a copying start signal, the documents are sent sheet by sheet automatically onto a document glass plate, and they are discharged into and held in a document discharge tray automatically after an exposure step has been carried out.

The ADF consists of a document feed unit adapted to receive preset documents and send out the documents sheet by sheet at accurate intervals, a transfer unit adapted to transfer each document onto a document glass plate and stop the document in a document setting position accurately, and a document discharge unit adapted to discharge the document from the document glass plate and store the same on the document discharge tray after the exposure of the document has been completed.

There are two types of document feed units, i.e. a document feed unit of a lower side document feed system in which stacked documents are fed sequentially with the lowermost document first, and a document feed unit of an upper side document feed system in which stacked documents are fed sequentially with the uppermost document first.

The lower side document feed system is advantageous in that the documents to be processed can be stacked one on top of the other. However, power required for a document separating operation is several times as large as that needed in the upper side document feed system in order to withdraw the lowermost document, and stress on the documents increases accordingly. This causes the documents to be deformed easily. Especially, a document separating member soiled by pencil-written documents stains other documents, and the pencil-written information is likely to be erased or blurred easily. These problems occur more or less in the document separating and feeding operations in the upper side document feed system as well.

In general, the documents handled in an image recording apparatus, such as a copier have on their surfaces information printed in printing ink or written with a writing instrument, so that such documents have greatly different feed characteristics. Moreover, many documents have different forms, i.e., they include slips, leaflets, hand-written documents and drawings, and also documents having perforations, folds and wrinkles. Since it is necessary that the documents be fed so as not to be hurt, some kinds of documents prove to be unsuitable for an ADF application.

There are some cases where the ADF cannot be used due to the necessity of preventing the occurrence of soiling of documents during the document separating and feeding operation.

In order to take copies of these documents, it is necessary that a document be placed on the document glass plate without using the ADF, with the ADF as a whole opened in the same manner as a document holding plate (platen cover), and that the ADF be then closed to carry out a copying operation. This requires a great deal of time and labor.

In order to copy one sheet of document or a small number of sheets of many different kinds of documents or various kinds of documents of different sizes by using the ADF with the documents fed sheet by sheet by hand, it is necessary to press a copying button each time, so that the copying operations become troublesome.

A semi-automatic document feeding apparatus (SDF) adapted to feed the documents, which are inserted sheet by sheet by hand, onto a document glass plate automatically and discharge the document automatically after the copying thereof has been finished. However, the SDF is not capable of processing a large number of documents automatically and continuously.

SUMMARY OF THE INVENTION:

An object of the present invention is to provide in view of these problems a document feeding apparatus capable of feeding documents properly irrespective of the kind and form thereof.

In order to take copies of the documents, which cannot generally be inserted automatically into a reproducing machine, in a document feeding apparatus according to the present invention, the copying mode is changed over by a push button pressing operation to a copying mode using a semi-automatic document feeder (which will hereinafter be referred to as SDF) provided in the ADF, and the documents are sent sheet by sheet to the SDF, whereby the above-mentioned problems are solved.

Specifically, the present invention provides a document feeding apparatus having a document feed unit adapted to feed documents, which are placed on a document feed tray, sheet by sheet toward a document glass plate in an exposure unit, characterized in that an auxiliary document feed tray is turnably provided on a portion of the document setting surface of the document feed tray, the auxiliary document feed tray being housed in the document feed tray when stacked ducuments are to be fed automatically, and the auxiliary document feed tray being turned so as to project over the document feed tray when the documents are fed sheet by sheet by hand so that the front end portion of the auxiliary document feed tray narrows a document feed port of the document feed unit to render the stacked documents difficult to be inserted thereinto.

The above and other objects as well as advantageous features of the invention will become apparent from the following description of the embodiments taken in conjunction with the accompanying drawings.

BRIEF DESCRIPTION OF THE DRAWINGS

FIGS. 6 and 7 are sectional veiws of a document feed tray in an ADF mode and an SDF mode, respectively, in another embodiment of the present invention.

DESCRIPTION OF THE PREFERRED EMBODIMENTS

A document feeding apparatus according to the present invention will now be described on the basis of an embodiment thereof shown in the accompanying drawings.

Figure 1:
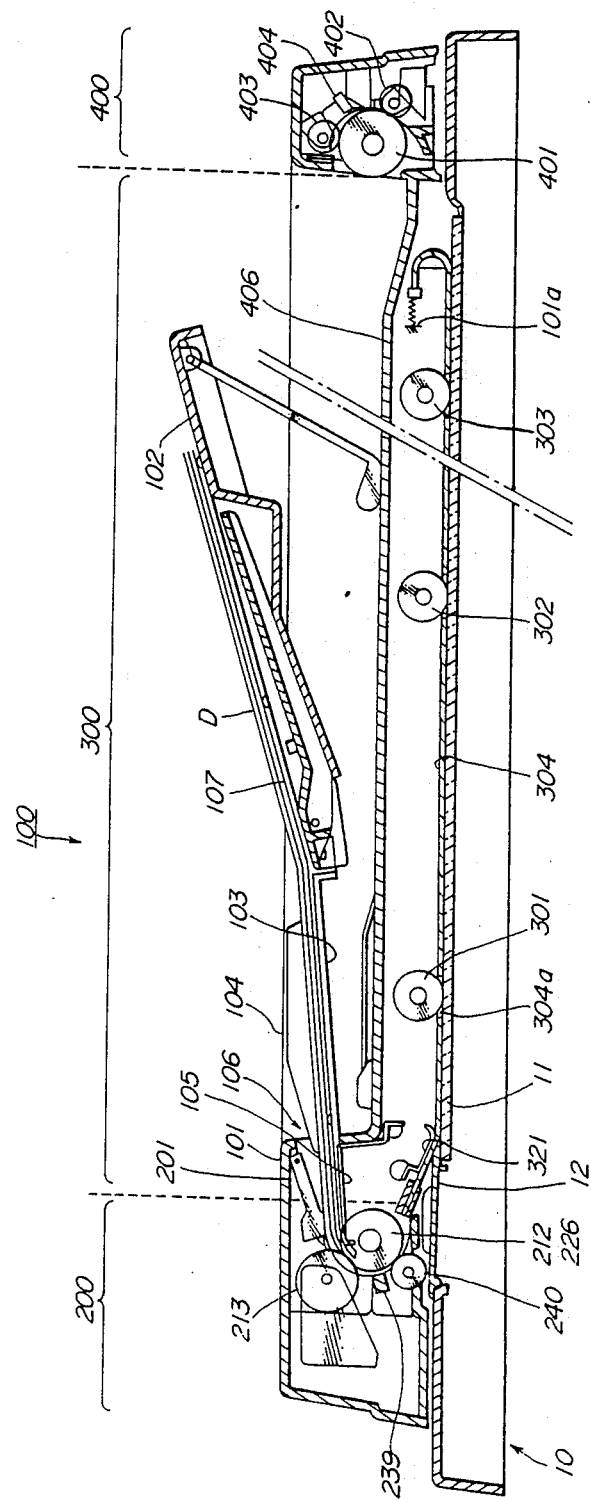
FIG. 1 is a sectional view of a document feeding apparatus according to the present invention.
Figure 2:
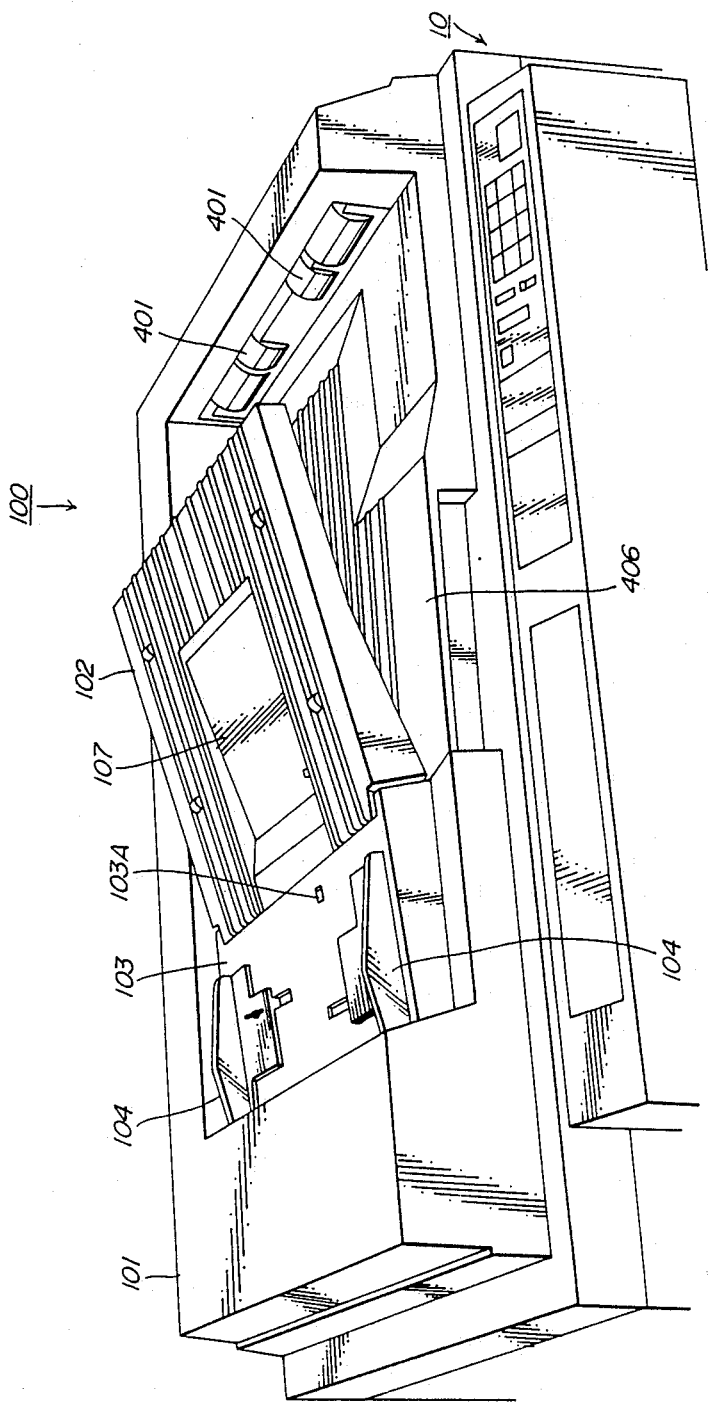
FIG. 2 is a perspective view of the document feeding apparatus.
Figure 3:
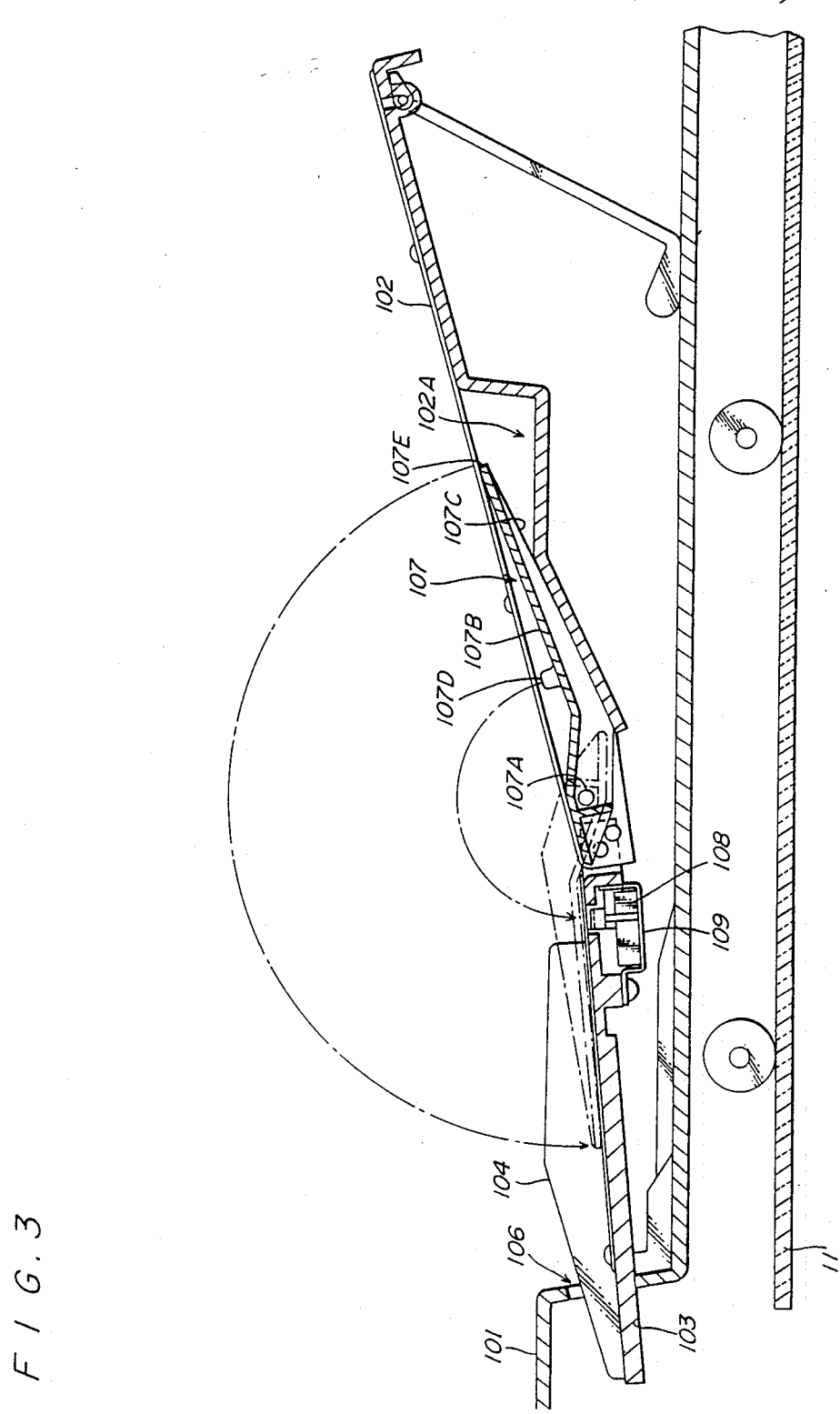
FIG. 3 is a sectional view of the portion of the document feeding apparatus which is in the vicinity of a document feed tray in an ADF mode.
Figure 4:
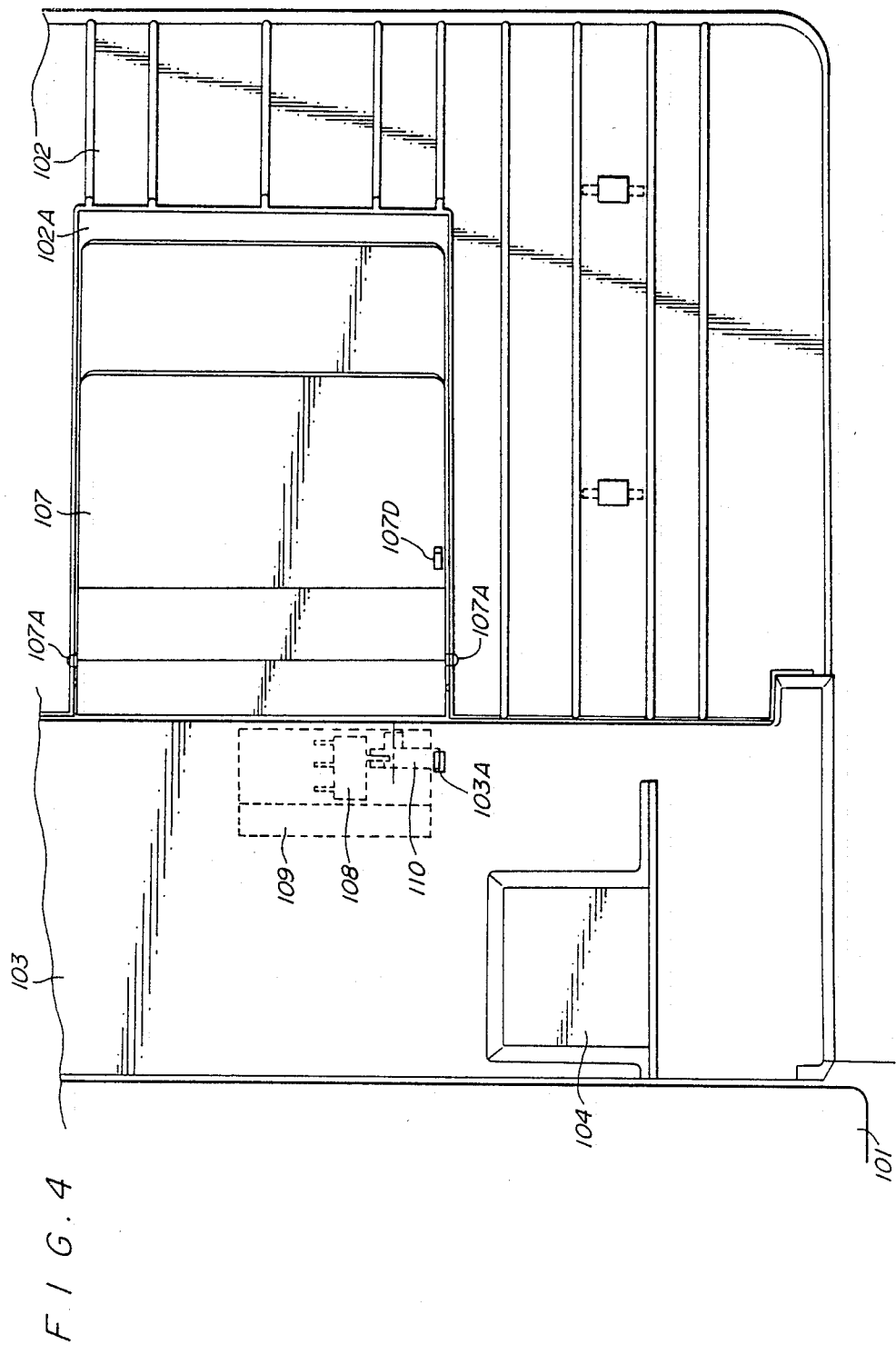
FIG. 4 is a plan view of the document feed tray.

FIG. 1 is a sectional view of the document feeding apparatus according to the present invention in an automatic document feeding state, FIG. 2 a perspective view of the apparatus, FIG. 3 a sectional view of the portion of the apparatus which is in the vicinity of a document feed tray, and FIG. 4 a plan view of the document feed tray.

Referring to these drawings, a reference numeral 10 denotes a reproducing machine body, 11 a document glass plate, and 12 a document rear end stopper member (striking member), and a document feeding apparatus 100 is mounted above the document glass plate 11. The document feeding apparatus 100 is fixed to a hinge portion at the upper section of the reproducing machine body 10, and has a pivotable construction so that the upper surface of the document glass plate 11 can be opened and closed. The document feeding apparatus 100 consists of three main portions, i.e. a document feed unit 200, a transfer unit 300 and a document discharge unit 400.

The document feeding apparatus 100 is provided at the upper portion thereof with a document feed tray unit constituting of a foldable and movable document feed tray 102, and a fixed document feed tray 103 secured to a housing body 101, in such a manner that both of these trays 102, 103 are inclined. The documents D can be placed in a stacked state on the document feed tray unit, and the front end portions of the documents D are inserted into a feed port 106 of the document feed unit 200.

The fixed document feed tray 103 is provided thereon with document width controllers 104, which are used to control the width of the documents D when the documents D are set, in such a manner that the document width controllers 104 can be laterally moved. The substantially central portion, on a downstream side with respect to the document feeding direction, of the fixed document feed tray 103 is recessed, and this recessed portion is provided therein with a movable guide 105 so that the guide 105 can be turned vertically away from and toward the upper surface of the fixed document feed tray 103. This movable guide 105 is connected to a driving means (not shown) and made pivotable.

The substantially central portion, on a downstream side with respect to the document feeding direction, of the document setting surface of the movable document feed tray 102 is provided with a recess 102A. The recess 102A is provided therein with an auxiliary document feed tray 107 so that the auxiliary document feed tray 107 can be moved out of and retracted into the recess 102A.

The shafts 107A, 107A at the front portion of the auxiliary document feed tray 107 are fitted into bores in the movable document feed tray 102 and supported rotatably. The lower side 107C of the auxiliary document feed tray 107 held in the recess 102A in the movable document feed tray 102 is brought into contact with a part of the surface of the recess 102A. In this state, the upper side 107B of the auxiliary document feed tray 107 is positioned below the document setting surface of the movable document feed tray 102, so that an ADF document feeding operation is not prevented.

In order to carry out an SDF document feeding operation in which documents are fed sheet by sheet by hand, the finger tips are inserted into the recess 102A, and a free end portion 107E of the auxiliary document feed tray 107 is held thereby. When the free end portion 107E is then turned in the direction of a one-dot chain arrow in FIG. 3, the auxiliary document feed tray 107 is moved pivotally counter-clockwise around the shafts 107A, and the upper side 107B of the auxiliary document feed tray 107 engages the upper surface of the fixed document feed tray 103 and stops, so that an SDF document feeding operation is ready to be started.

Figure 5:
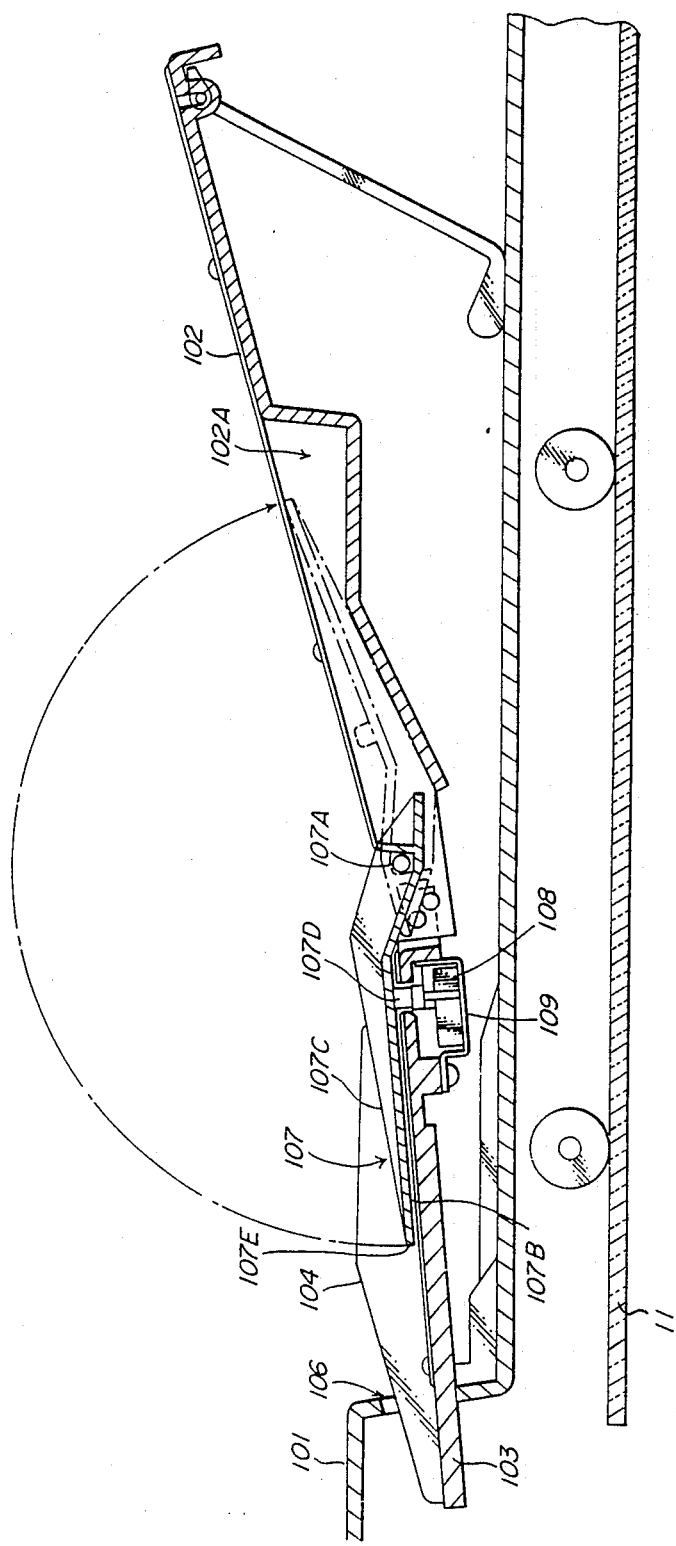
FIG. 5 is a sectional view of the document feeding apparatus which is in the vicinity of the document feed tray in an SDF mode.

FIG. 5 is a sectional view of the document feed tray unit in SDF document feeding operation. In this condition, the auxiliary document feed tray 107 projects over the upper surface of the fixed document feed tray 103, and the lower surface 107C of the auxiliary document feed tray 107 is used as a surface on which the documents fed sheet by sheet by hand are placed and moved slidingly.

A projection 107D is fixed to a portion of the upper side 107B of the auxiliary document feed tray 107.

A small through bore 103A is provided in a portion of the fixed document feed tray 103. An SDF mode change-over unit is provided on the portion of the lower surface of the fixed document feed tray 103 which is in the vicinity of this small bore 103A. The SDF change-over unit consists of a microswitch 108, a microswitch mounting plate 109 and a change-over lever 110. One end portion of the change-over lever 110 is engaged with the actuator of the microswitch 108, and the other end portion thereof is fitted in the small bore 103A, an intermediate shaft portion thereof being supported pivotably on the mounting plate 109.

When the auxiliary document feed tray 107 is turned around the shafts 107A to fall the same leftward as shown in FIG. 5, the projection 107D fixed to one portion of the auxiliary feed tray 107 enters the small bore 103A of the fixed document feed tray 103 to press down the free end portion of the change-over lever 110 positioned on the inner side of the small bore 103A. Consequently, the change-over lever 110 is turned around the intermediate shaft portion thereof, and the other end portion thereof operates the actuator of the microswitch 108 to turn on the same. In accordance with this input signal, an SDF mode is detected on the basis of a preset control program in the reproducing machine body, so that the SDF mode is automatically selected. The selected SDF mode is displayed by a label pasted on the lower surface 107C of the auxiliary document feed tray 107, in such a manner that the indication can be recognized at a glance.

This SDF mode detector may consist of an optical detecting element, such as a photointerrupter instead of a microswitch.

Figure 6:
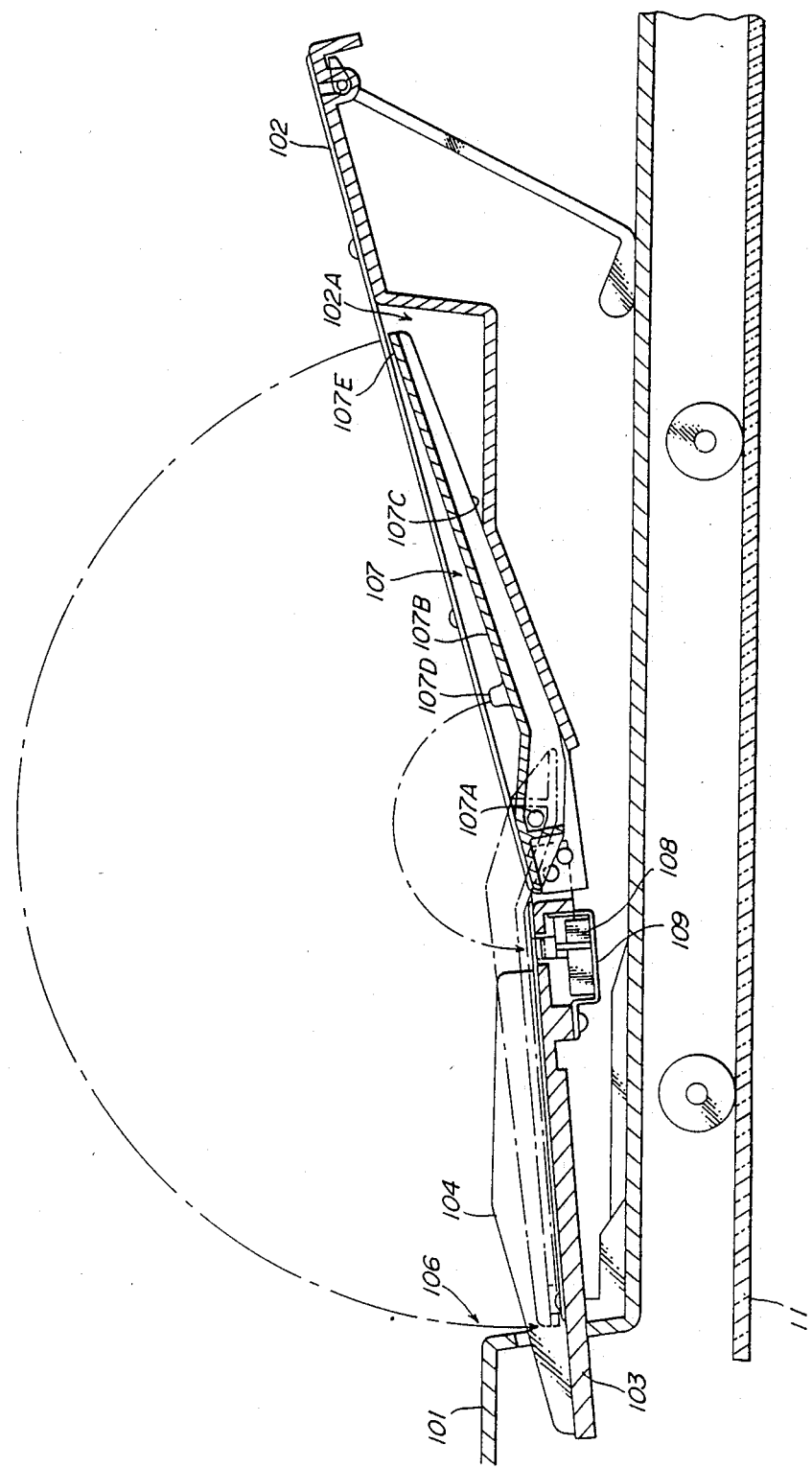

In another embodiment of the present invention, as shown in FIGS. 6 and 7, the front end portion 107E of an auxiliary document feed tray 107 in an SDF operation is positioned in the vicinity of a document feed port 106 of a housing body 101 to half close the feed port 106, i.e., this end portion 107E can be formed so as to narrow the document feed port 106. In this embodiment, the documents are fed sheet by sheet by hand to this narrowed document feed port 106.

The auxiliary document feed tray 107 is placed in an upwardly bulging state on the upper surface of a fixed document feed tray 103, and the bulging portion extends up to the document feed port 106 so as to half close the same. Therefore, it is difficult to insert a large number of sheets of stacked documents into the feed port 106. Namely, it is clearly understood that inserting the documents, which are stacked on the document feed trays 103, 107, into the document feed port 106 and carrying out an ADF operation with the document feeding mode set to an SDF mode cannot possibly be done, and the operator immediately senses that an erroenous operation is being carried out.

The operation in an ADF mode of the document feeding apparatus according to the present invention will now be described.

First, documents are placed with the recorded surfaces thereof directed upward on the document feed tray unit consisting of the fixed document feed tray 103 and movable document feed tray 102, and the front end portions of the documents are set properly in an inlet portion of an opening of the document feed unit.

(A) First feeding of documents:

When a copying button is pressed with the documents kept in this state, a solenoid is energized by a feeding start signal to cause the front end portion of the movable guide 105 to lower, and a main motor in the document feeding apparatus to start being reversely rotated. Owing to the reverse rotation of the main motor, the stacked documents are fed as they are held between a feed roller (first feed roller) 212 and a feed lever 201, and the documents in the upper layers are prevented from being fed at a position of nipping of the feed roller 212 and a double feed preventing roller 213, so that a lower document alone is separated and further fed.

(B) Second feeding of documents:

When the front end of the document has passed a document detecting sensor 239, the solenoid is turned off by a signal representative of this passage after a predetermined period of time (150 ms) has elapsed, to cause the movable guide 105 to be returned to an upper position, and the main motor to be changed over from a reverse rotation mode to a forward rotation mode. As a result, the feed roller 212 is rotated freely, and the document slides on the upper surface of the stopper member 12 in accordance with the driving rotation of a second feed roller 226 and the rotation of a driven roller 240 which is in press-contact with the second feed roller 226, to reach the upper surface of the document glass plate 11. The document further slides through a clearance between the upper surface of the document glass plate 11 and the lower surface of a white sheet member 304, and is transferred forward by document transfer rollers 301, 302, 303 which are pressed against the document through the holes 304a made in the sheet member 304.

(C) Stopping of document:

When the rear end of the document has passed the document detecting sensor 239, a predetermined number of pulses (45 pulses) are counted after the generation of a signal representative of this passage, and the main motor is then changed from the forward rotation mode to the reverse rotation mode. At the time of starting of this rotation mode switching operation, the rear end of the document is in a position on the right side of the stopper surface of the stopper member 12. When the main motor is rotated reversely, the document transfer rollers 301, 302, 303 are driven clockwise to move the document back and bring it into contact with the stopper surface of the striking member 12. After the above-mentioned pulse counting operation, a predetermined number of pulses (28 pulses) are further counted. The white sheet member 304 then lowers, so that the clearance between the white sheet member 304 and striking member 12 is closed. Therefore, the document does not fly over the striking member 12 to return to the document feed unit 200. The document is pressed closely against the document glass plate 11 by the white sheet member 304. The exposure of the document is carried out with the document in such a stopped, closely contacting state.

(D) Discharging of document:

When the exposure of the document has been completed, the main motor is changed over from the reverse rotation mode to the forward rotation mode. Consequently, the transfer rollers 301, 302, 303 are rotated forward to send out the document toward the document discharge unit 400. The front end portion of the document passes a position of nipping of a forwardly rotating document discharge roller 401 and a pinch roller 402, which is pressed against the roller 401, via a guide member. It then passes a position of detection of a discharge document sensor 404 provided in the transfer passage in the document discharge unit 400, and then a position of nipping of the discharge roller 401 and a pinch roller 403, the document being then discharged from a document discharge port and placed on a discharged document tray 406 positioned outside. The succeeding documents are also transferred and discharged in the same repeated manner and placed on the discharged documents tray 406 sequentially.

The operation in an SDF mode of the document feeding apparatus according to the present invention will now be described.

(a) First, the auxiliary document feed tray 107 is turned as previously mentioned, to bring it into contact with the upper surface of the fixed document feed tray 103 as shown in FIG. 5. The document feeding mode is thereby changed over immediately to an SDF mode, and the main motor starts being driven.

(b) One sheet of document is then placed on the movable document feed tray 102, fixed document feed tray 103 and auxiliary document feed tray 107, and slides along the inclined surfaces thereof, the document being then sent from the document feed port into the document feed unit 200.

(c) Since the rollers in the document feed unit are already rotated by the operation for changing over the document feeding mode to the SDF mode, this document is subjected to the above-mentioned first document feeding step (A), second document feeding step (B), document stopping step (C) and document discharging step (D), and then sent out onto the upper surface of the discharge tray 406.

The document feeding apparatus according to the present invention is not limited to these embodiments. The present invention can also apply to various other types of document feed trays.

As described above, the document feeding apparatus according to the present invention is provided with a movable auxiliary document feed tray on the document feed tray in the ADF unit to enable the ADF and SDF modes to be switched to each other by a simple operation. This enables the handling of one sheet of document or a small number of different kinds of documents to be done easily. The present invention also renders it possible to reliably feed a thin document or a wrinkled document, which is difficult to be separated from other documents and fed in the ADF mode, or a document written by hand with a pencil and apt to soil other documents, by changing over the ADF mode to the SDF mode.

Moreover, the ADF mode and SDF mode can be clearly distinguished from each other by the mode of use of the auxiliary document feed tray during a reproduction operation. In addition, even if documents are set on the document feed tray by mistake with the document feeding mode set to the SDF mode, the documents are hardly inserted into the feed port, so that an erroneous document feeding operation is immediately found out.

The SDF means is simply in construction and operated reliably, and causes no trouble even in the ADF mode.

What is claimed is:

1. In a document feeding apparatus having a document feed unit adapted to feed documents, which are placed on a document feed tray, sheet by sheet toward a document glass plate in an exposure unit, the improvement characterized in that an auxiliary document feed tray is turnably provided on a portion of the document setting surface of the document feed tray, the auxiliary document feed tray being housed in the document feed tray when stacked documents are to be fed automatically, and the auxiliary document feed tray being turned so as to project over the document feed tray when the documents are fed sheet by sheet by hand.

2. The document feeding apparatus according to claim 1, wherein the front end portion of the auxiliary document feed tray projected over the document feed tray narrows a document feed port of the document feed unit to render the stacked documents difficult to be inserted thereinto.

* * * * *